Aug. 1, 1972  L. H. PRINCEN  3,681,099
GLOSSY FINISH LINSEED WATER EMULSION PAINTS
AND NONAGGLOMERATED PIGMENT COMPOSITION
FOR SAID PAINTS
Filed Aug. 4, 1970

INVENTOR
LAMBERTUS H. PRINCEN

BY
ATTORNEY

United States Patent Office

3,681,099
Patented Aug. 1, 1972

3,681,099
GLOSSY FINISH LINSEED WATER EMULSION PAINTS AND NONAGGLOMERATED PIGMENT COMPOSITION FOR SAID PAINTS
Lambertus H. Princen, Peoria, Ill., assignor to the United States of America as represented by the Secretary of Agriculture
Continuation-in-part of application Ser. No. 705,316, Feb. 14, 1968. This application Aug. 4, 1970, Ser. No. 61,252
Int. Cl. C09c 1/04, 1/36; C09d 3/30
U.S. Cl. 106—254
4 Claims

ABSTRACT OF THE DISCLOSURE

Stable aqueous emulsion linseed oil housepaints having a PVC of 28 percent and that dry to nonflat, i.e., semigloss or highly glossy finishes are produced by first dispersing the metallic oxide pigment(s) in hexane, benzene, chloroform or similar low boiling solvent containing emulsifiers and sufficient linseed oil to fully coat the unaggregated $0.25\mu$ pigment particles, and the resulting dispersion or suspension is then gently emulsified in water. Evaporation of the low boiling solvent followed by the incorporation of additional oil provides the improved aqueous linseed emulsion paint of the invention.

Figure 1:
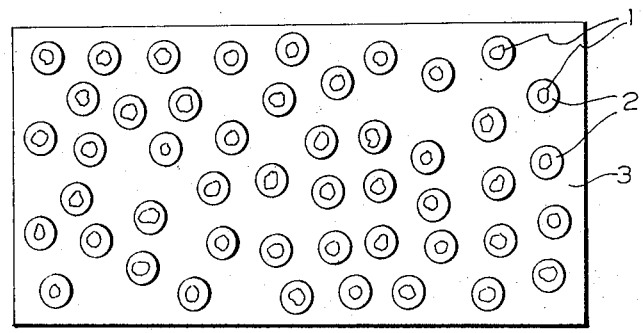

A nonexclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This is a continuation-in-part of Ser. No. 705,316, filed Feb. 14, 1968, now abandoned. The present invention relates to a process for preparing shelf-stable vegetable oil emulsion paints in the form of linseed oil aqueous emulsions that provide distinctly glossy finishes.

More specifically, the present invention relates to the discovery that improved linseed aqueous emulsion paints that dry to semigloss or glossy finishes are successfully achieved by a process wherein the discrete very minute particles of highly dispersed white pigment are individually enclosed within a droplet of emulsified oil, which layer is completely compatible with and promotes the smooth flow therearound of the linseed binder as the water evaporates from the oil emulsion.

BACKGROUND OF THE INVENTION

Film formation from a solvent-based linseed coating is a simple process. As the solvent evaporates and the molecularly dissolved linseed binder packs around and between the pigment particles, the latter are not aggregatively disturbed by the flow of binder, and the resulting film tends to be glossy.

Film formation from emulsion paints is much more complex. As the water evaporates, the binder (oil) droplets deposit among the pigment particles, but flow between the pigment particles and the binder is relatively poor because of the distinctly hydrophilic character of the pigment particles that is required for their effective dispersion in an aqueous system. The poor flow of the hydrophobic binder causes appreciable aggregation of pigment particles and the resulting film is porous, rough-textured, and nonglossy.

Another difference between solvent-based and the prior art water linseed emulsion paints exists in the tendency of such alkaline pigments as zinc oxide in aqueous systems to react ionically with other pigments, such as $TiO_2$ as well as with emulsion droplets, emulsifiers, and other additives, thereby resulting in elevation of pH and the formation of flocculates that greatly increase the viscosity and cause extensive sedimentation, such interaction being particularly pronounced with zinc oxide, which is usually included in white exterior house paints because of its superior mildewcidal activity and its ability to strongly absorb UV (ultra-violet) radiation. The disadvantageous ionic interactions have so far prevented the commercial advent of even flat finish, storage-stable aqueous linseed emulsion paints containing zinc oxide, although I have recently discovered that the partial replacement of conventional anionic and nonionic emulsifiers by a cationic emulsifier prevents the slow reaction of zinc oxide with titanium dioxide in a flat finish oil emulsion medium as set forth in U.S. Pat. 3,488,202.

Efforts by the vegetable oil industry to stem the extensive displacements of the traditional oil-based paints by the easy clean-up, water vehicle latex paints resulted in the introduction in 1961 of flat finish linseed oil emulsion paints. Later there appeared water soluble linseed oil paints that dry to glossy finishes, but the cost of introducing hydrophilic groups onto the linseed oil greatly increases the cost of these paints, and the tendency of the "uninsulated" pigments to interact with another species limits or prevents the use of zinc oxide in the presence of titanium dioxide pigment. No glossy finish linseed water emulsion paints have appeared to date.

The principal object of the present invention is the development of a highly stable, aqueous emulsion linseed oil, white or pastel tinted paint that does not thicken on prolonged storage, that cleans up without organic solvents, and that dries to a durable, glossy-type mildew-resistant finish.

Another object is a process for providing such glossy finish linseed oil aqueous emulsion paints.

Yet another object is the provision of an aqueous emulsion of nonagglomerated, linseed oil encapsulated pigment particles that can be marketed as such and that can be made into the ultimate glossy finish linseed emulsion paint simply by homogenizing the above pigment material with aqueous linseed emulsion plus mineral spirits or with additional linseed oil, emulsifiers, and metallic driers, all blended with a relatively small amount of mineral spirits.

Still another object of the invention is the discovery of a process for providing high covering power glossy emulsion paints wherein the gloss finish is not obtained by the conventional adverse expedient of lowering the pigment volume concentration (PVC) and consequently the hiding power of the paint.

Other objects and advantages will be readily apparent to those skilled in the art.

In accordance with the stated objects of the invention, I have now discovered that linseed oil aqueous emulsion paint formulations exhibiting the above characteristics are obtained by a process comprising emulsifying an especially prepared slurry of emulsified oil-encapsulated nonaggregated pigment particles in water that contains a conventional combination of surfactants and then directly emulsifying additional linseed oil or linseed water emulsion into the obtained pigment emulsion.

More specifically, the process comprises the following steps:

(1) dispersing the ZnO and/or $TiO_2$ pigment in a nonaqueous low boiling solvent (i.e., hexane) solution containing about 7 percent to about 13.5 percent and preferably 10 percent of the pigment weight of linseed oil and about 1 percent total of emulsifiers on the same basis;

(2) forming an aqueous emulsion by homogenizing the above pigment phase with from about 75 to about 85 percent, based on the weight of pigment, of water and from about 5 percent to about 8 percent of conventional mixed nonionic emulsifiers;

(3) gradually evaporating the hexane from the emulsion, said emulsion being a hexene-in-water emulsion in which the linseed oil and pigments are contained in hexane droplets, thereby obtaining a continuous aqueous phase containing discrete nonaggregated pigment particles, each being encapsulated within a strongly adherent oil-emulsifier envelope;

(4) incorporating sufficient additional linseed oil or oil emulsion blended with a suitable organic solvent, emulsifiers, and metallic driers into the pigment emulsion to provide a stable paint with the desired pigment-to-oil ratio and having the ability to dry to a glossy finish.

Figure 2:
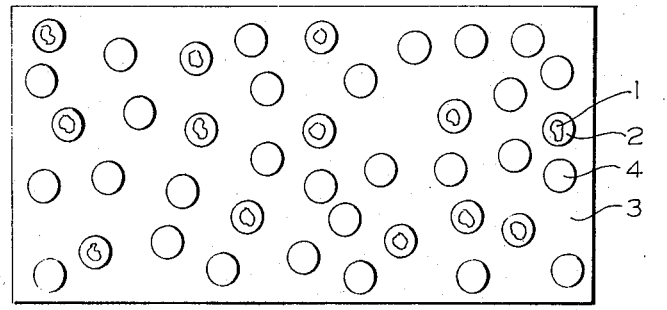

The drawings consist of two graphic representations of oil-in-water emulsions. FIG. 1 is a paint pigment composition, and FIG. 2 is an aqueous emulsion paint.

A paint pigment composition is defined here as a formulation which contains all the pigment necessary to form a paint when sufficient oil or oil emulsion is added. FIG. 1 describes in graphic form the most important aspects of the instant invention, i.e., that the formulation is an oil-in-water emulsion and that none of the pigment is in direct contact with the water phase. It is the fact that each pigment particle 1 in the emulsion is coated with a microlayer( i.e., contained in a droplet) of oil 2, and that each coated pigment particle is surrounded by water 3 that solves the problems of prior art emulsion paints described above. Other types of pigment compositions are known, Jones and Kilkeary, U.S. Pat. 3,210,209, but these are color bases used to tint already formulated paints. These color bases have a composition which can contain at the most a few percent water, while the instant invention, in order to achieve an oil-in-water emulsion, must contain at least 30 percent water in the total paint formulation or pigment composition. The color bases of U.S. Pat. 3,210,209 are at all times organic solvent-based systems, whereas in the present invention water is the continuous phase.

When the pigment composition is homogenized with a calculated amount of linseed oil containing mineral spirits, conventional emulsifiers, and metallic driers or with a water emulsion of the above oil mixture, an oil-in-water paint (FIG. 2) is produced. The pigments, 1, each surrounded by the droplet of oil 2 remain intact but are now dispersed in the water phase 3 along with oil droplets 4 which contain no pigment.

In U.S. Pat. 2,077,167 a method is described for calculating the amount of fatty acid needed to coat a pigment with a molecular monolayer of oil. The formula for this calculation is given as $$\frac{6}{DPS}$$

where D is the average diameter and P is the specific gravity of the pigment particle. S equals the surface area covered with one monolayer by 1 g. of oil. Applying this method to the instant invention gives the following computations:

D for the $TiO_2$ pigment used is $0.25\mu$;
P for $TiO_2$ is 4.2 g./cm.$^3$;
S for linseed oil is given in the literature as 66 A.$^2$ per molecule; this calculates out to be $4.54 \times 10^6$ cm.$^2$/g. of oil;

$$\frac{6}{DPS} = \frac{6}{0.25 \times 10^{-4} \times 4.2 \times 4.53 \times 10^6}$$

$$= 1.26 \times 10^{-2} \text{ g. oil/g. } TiO_2$$

If 0.1 g. of oil/g. $TiO_2$ is used in the instant invention (see examples), then $$\frac{0.1}{1.26 \times 10^{-2}} = 8$$

According to the above calculations, the amounts of oil used in the examples forms a layer on the $TiO_2$ pigments equivalent to 8 molecular monolayers.

A second method of calculating the thickness of the oil coating is based on the fact that 0.1 g. of oil/g. $TiO_2$ equals (dividing both oil and pigment by their respective densities) 0.452 cm.$^3$ of oil/cm.$^3$ of $TiO_2$. If $$\text{volume}/TiO_2 = \frac{\pi}{6} X (0.25\mu)^3; \text{ each particle has } 0.452$$

$$\times \frac{\pi}{6} X (0.25\mu)^3$$

of oil surrounding it. The total volume of an oil-coated particle is then $$1.452 \left[ \frac{\pi}{6} (0.25\mu)^3 \right]$$

and the diameter of this oil-coated particle is $$X = \sqrt[3]{1.452(0.25\mu)^3} \text{ or } X = \frac{1}{4} \sqrt[3]{1.452\mu} = \frac{1.13}{4\mu} = 0.283\mu$$

The thickness of the oil layer would be $$\frac{X - D \text{ for } TiO_2}{2}$$

or 165 A. Since a triglyceride molecule in linseed oil has a molecular length of 20 A., the oil layer would be a minimum of 8 monolayers thick.

Both of the above methods of calculation depend on the assumption that the molecules of oil are standing on end with the hydrocarbon ends directed away from the pigment particle. For fatty acids this is a valid assumption, but for triglycerides it is just as valid to assume a spherical molecule. A spherical triglyceride molecule in LSO would have a diameter of $14.42 \times 10^{-8}$ cm., the surface area of 1 g. $TiO_2$ having a particle diameter of $0.25\mu$ would be $5.72 \times 10^4$ cm.$^2$, and the volume of a monolayer of LSO on this surface area would be $5.72 \times 10^4$ cm.$^2 \times 14.42 \times 10^{-8}$ cm. or $8.26 \times 10^{-3}$ cm.$^3$. Since 0.1 g. of oil has a volume of 0.1075 cm.$^3$, there are at least 13 monolayers of oil on each pigment particle.

In view of the above calculations, a pigment particle enveloped within a droplet of linseed oil will be taken to mean that each pigment will have the equivalent of at least from 8 to 13 molecular monolayers of oil.

The following preferred embodiments will more precisely illustrate my invention.

Example 1

A pigment suspension was prepared by dispersing the indicated weight of finely divided pigments (ca. $0.25\mu$ particles) in at least two volumes of hexane containing 10 percent linseed oil based on the weight of pigment, plus conventional emulsifiers, as shown in the following formulation, using a Lourdes "Volumixer" for 30 minutes at 5000 r.p.m. at an electronically controlled temperature of 25° C.

|  | G. |
|---|---|
| Titanium dioxide ("Tipure-90"; E. I. du Pont de Nemours) | [1] 200 |
| Zinc oxide ("Azo ZZZ-55"; Amer. Zinc Sales Co.) | [2] 100 |
| Heat-bodied M-25 linseed oil (50,000 cps.) | 30 |
| "Span-85" Atlas Powder Co. (fatty partial esters of hexitol anhydride) | 1.2 |
| "Span-20" Atlas Powder Co. (fatty partial esters of hexitol anhydride) | 2.5 |
| Hexane | [3] 130 |

[1] 47.6 ml. (based on specific gravity of 4.2 g./ml.).
[2] 17.4 ml. (based on specific gravity of 5.6 g./ml.).
[3] 197 ml. (based on density of 0.66 g./ml.).

Then the following aqueous solution or phase was added to the pigment suspension and the mixture was emulsified using the "Volumixer" under the previously described conditions.

| | |
|---|---:|
| Distilled water | ml 230 |
| Ethylene glycol | g 28 |
| "Tween 85"; Atlas Powder Co. (polyoxyethylenated fatty partial ester of hexitol anhydride) | g 5.3 |
| "Igepal CO–630"; General Aniline and Film Corp. (alkyl phenoxy polyoxyethylene ethanol) | g 12.5 |

The resulting emulsion was placed in a 1-liter evaporating flask equipped with a Dean-Strak trap, a few drops of a conventional foam suppressant were added, and the hexane was then evaporated in about 6 hours along with 25 ml. of water by aspirator-induced negative pressure.

The water loss was conveniently made up by the addition of a conventional thickener, i.e., 25 ml. of a 4 percent solution of high viscosity hydroxyethyl cellulose ("Cellosize WP–4400"; Union Carbide Co.). Inspection of the pigment particles at this stage with a Coulter counter and by electron microscopy showed that nearly all of the pigment particles were still $0.28\mu$, while only a small number measured $0.5\mu$, and that none exceeded $1.0\mu$, thus indicating that the method of encapsulation with oil effectively prevented the formation of particle aggregates.

By contrast, electron micrographs of the free-flowing pigment obtained by spray drying the $TiO_2$ or ZnO particles coated with 18.8 percent by weight of linseed oil and obtained from so drying a dispersion of 100 parts of the pigment in a chloroform solution comprising not over 20 parts of oil per 100 parts of pigment, showed aggregates having diameters of up to $50\mu$, which could not possibly provide a glossy finish.

Inasmuch as previous experiments had clearly shown us that attempts to add all of the linseed oil in the previous encapsulating step were utterly unsuccessful and inoperative, 116 g. of commercially obtained S–70 heat bodied linseed oil, i.e., having a viscosity of ca. 5000 cps., was readied for use by additions of 18 g. of mineral spirits, i.e., painters' naphtha, a 1.5 g. mixture of conventional hexitol anhydride fatty ester emulsifiers, and 7.4 g. total of commercial lead and cobalt naphthenate solutions. Then 133 g. of the above linseed oil solution was magnetically stirred into 582 g. of the emulsified pigment suspension, and then the whole was homogenized to provide a stable oil-in-water emulsion paint containing 65 percent total solids by weight, a pigment volume concentration (PVC) of 28 percent, and a pH of ca. 7.3. Films applied to wood dried to a white finish having a gloss only slightly less than that of a conventional enamel.

During 6 months of storage in a closed container, the pH remained unchanged and the paint did not undergo an increase in viscosity.

Example 2

To test the possibility that the pigments could also be offered to wholesalers as a relatively low water content dispersion for subsequent addition of a precalculated amount of linseed-water emulsion, 200 g. of $TiO_2$, 100 g. of ZnO, 40 g. of M–25 linseed oil, 0.8 g. "Span-85," and 1.6 g. "Span-20" were added to 180 g. hexane and homogenized for 30 minutes to a smooth suspension that was then emulsified following the addition of a solution consisting of 250 ml. water, 3.6 g. "Tween-85," and 18.9 g. of "Igepal CO–630." The hexane was gradually evaporated by stirring for 6 hours under partial vacuum, and the resulting suspension was then transferred to a centrifuge accompanied by a small amount of wash water. Following about 15 minutes of centrifuging, the aqueous layer was aspirated, leaving the pigment in the form of a paste which was washed in the same manner with 200 ml. of added water. Analysis of the twice-centrifuged paste showed that it still contained 32.03 percent $H_2O$, 39.93 percent $TiO_2$. 19.96 percent ZnO, and 8.01 percent linseed oil containing trace levels of emulsifiers.

Then to 167 g. of the above partially dewatered paste was added a linseed oil emulsion of 43.7 g. M–25 bodied linseed oil, 28.2 g. $H_2O$, 10.4 g. ethylene glycol, 9.7 g. total of conventional emulsifiers, 11 g. of mineral spirits, and 0.31 g. total commercial solutions of lead and cobalt naphthenates. The mixture was easily blended in a household mixer to provide a stable white paint having a PVC of 25 percent and a total solids concentration of 62 percent.

Applications of brushed films of the above paint to wood and glass surfaces resulted in distinctly glossy finishes.

I claim:
1. A process of preparing a nonagglomerated paint pigment composition comprising:
   (a) dispersing the desired ratio of $TiO_2$ and ZnO pigment particles in from about two to four times the pigment volume, based on the specific gravity of the pigments, of hexane containing about 1 percent nonionic emulsifiers and from about 10 percent to about 13.5 percent bodied linseed oil based on total pigment weight;
   (b) homogenizing the so-produced dispersion with from about 75 to about 85 percent water and from about 5 percent to about 8 percent nonionic emulsifiers based on total pigment weight to provide a hexane-in-water emulsion in which the linseed oil and pigments are contained in hexane droplets;
   (c) evaporating the hexane from the above-produced emulsion under slightly reduced pressure, thereby providing a hexane-free emulsion that upon homogenization with sufficient amounts of linseed oil, conventional nonionic emulsifiers and metallic driers forms a paint that dries to a nonflat glossy finish; and
   (d) optionally centrifuging the hexane-free emulsion to permit the removal of a substantial portion of the water, thereby providing a less bulky pigment composition that upon homogenization with a sufficient amount of pigment-free linseed oil-in-water emulsion forms a paint that dries to a nonflat glossy finish.

2. A nonaggregated paint pigment composition comprising an aqueous dispersion of essentially discrete $TiO_2$ particles substantially each of which is enveloped within a droplet of linseed oil, and similarly enveloped discrete particles of ZnO; which contains from about 10.0 percent to about 13.5 percent linseed oil, from about 50 percent to about 80 percent water, and from a trace amount to about 8 percent nonionic emulsifiers based on pigment weight; said pigment composition when homogenized with a sufficient amount of linseed oil, conventional emulsifiers and metallic driers or with a sufficient amount of a linseed oil-in-water emulsion containing emulsifiers and driers being capable of providing a highly stable mildew-resistant, high-pigment content paint that dries to a nonflat glossy finish.

3. A mildew-resistant paint that dries to a nonflat glossy finish comprising a stable oil-in-water emulsion containing essentially discrete $TiO_2$ particles each of which is enveloped within a droplet of linseed oil, and similarly enveloped discrete particles of ZnO; said linseed oil being present in amounts equal to from about 10 percent to about 13.5 percent of the total pigment weight and which contains an amount of nonionic emulsifier equal to about 1 percent of the total pigment weight, said emulsion also containing additional linseed oil, nonionic emulsifiers, metallic driers, and water in sufficient quantities to provide said mildew-resistant paint.

4. The mildew-resistant paint of claim 3 which is further characterized by a total solids content of about 65 percent, a PVC of about 28 percent, and a pH of about 7.3.

References Cited

UNITED STATES PATENTS

| | | | |
|---|---|---|---|
| 2,077,167 | 4/1937 | Crouet | 106—308 F |
| 2,183,227 | 12/1939 | Scholz | 106—254 |
| 2,915,411 | 12/1959 | Schumacher et al. | 106—253 |
| 3,037,875 | 6/1962 | Geiser | 106—253 |
| 3,210,209 | 10/1965 | Jones et al. | 106—253 |
| 3,346,409 | 10/1967 | Walrond | 106—253 |

ALLAN LIEBERMAN, Primary Examiner

U.S. Cl. X.R.

106—253, 262, 308 F